United States Patent [19]

Hennig

[11] 4,152,063

[45] May 1, 1979

[54] CAMERA

[75] Inventor: Fridolin Hennig, Zorneding, Fed. Rep. of Germany

[73] Assignee: AGFA-Gevaert, A.G., Leverkusen, Fed. Rep. of Germany

[21] Appl. No.: 827,169

[22] Filed: Aug. 24, 1977

[30] Foreign Application Priority Data

Aug. 25, 1976 [DE] Fed. Rep. of Germany ....... 2638298

[51] Int. Cl.² .................. G03B 17/50; G03B 1/00
[52] U.S. Cl. ...................................... 354/212; 354/86
[58] Field of Search ............... 354/83, 86, 288, 187, 354/212, 213, 202, 204, 205, 206

[56] References Cited

U.S. PATENT DOCUMENTS

| 2,679,196 | 5/1954 | Sochor et al. | 354/212 |
| 3,185,060 | 5/1965 | Borghesani | 354/195 |
| 3,753,392 | 8/1973 | Land | 354/86 |
| 3,864,705 | 2/1975 | Winkler | 354/187 |
| 3,882,516 | 5/1975 | Ogiso et al. | 354/173 |
| 3,911,452 | 10/1975 | Veda | 354/83 |

FOREIGN PATENT DOCUMENTS 2218140 11/1972 Fed. Rep. of Germany .......... 354/212

*Primary Examiner*—Donald A. Griffin
*Attorney, Agent, or Firm*—Michael J. Striker

[57] ABSTRACT

The camera has a camera body provided with a lens. An input member is slidable relative to the camera body transverse to the optical axis of the lens. A motion-transmitting arrangement receives motion from the input member during such sliding and transmits motion to a camera component which requires to be operated, such as a pair of film-transporting nip rollers and/or a shutter mechanism.

7 Claims, 2 Drawing Figures

CAMERA

BACKGROUND OF THE INVENTION

1. Field of the Invention

The present invention relates to cameras.

More particularly, but not exclusively, the invention relates to a camera of the instant-picture (self-developing) type.

2. The Prior Art

Cameras of the self-developing type, with reference to which the invention will herein be explained by way of example, use film cassettes (film packs) wherein several individual film sheets are contained in a cassette housing. After an exposure has been made, the just exposed film sheet must be moved out of the cassette housing and transported to the exterior of the camera. During such transportation a developer substance contained in a pouch of the film sheet must be spread over the picture area to develop the latent image.

Various types of drives have been proposed for the film transporting mechanism of such cameras. This includes electric motors, cranks which must be turned by hand and slidable input members which slide parallel to the direction of film transportation and transmit motion to a gear train.

Slidable input members have various advantages which makes their use desirable. For example, they can serve certain auxiliary functions, such as to cover (and protect) a viewfinder of the camera when the input member is in its inoperative position. However, from a practical point of view these prior-art input members are not well suited for use in cameras in which the film sheet (developed picture) is expelled through an outlet at the top or the bottom (as compared to the sides or back) of the camera. The movement of these prior-art input members is parallel to the direction of film transportation, as observed above; hence, in a camera having a top or bottom outlet such movement would have to be in upward or downward direction. This is a difficult movement to impart to the input member (by hand) when, as is always the case in instant-picture cameras, a substantial amount of force must be applied to the input member (to move the film sheet through the nip between a pair of rollers which serve to transport the film sheet as well as to squeeze the developer from its pouch and spread it over the exposure area of the film sheet).

To overcome this problem it has been proposed to make the input member slidable in parallelism with the optical axis. This permits the user to exert much greater force upon the input member. However, there is a general trend in many types of cameras (especially the so-called "pocket" cameras) to use slidable input members which are movable in a generally horizontal direction transverse to the optical axis. In these "pocket" cameras this presents no problem, because the film transport takes place in the same direction. To be consistent for different types of cameras it is desirable to have the same (transverse) direction of the slidable input member also in instant-picture cameras, especially as the "pocket" camera experience shows that users prefer it. Unfortunately, this is not readily possible in instant-picture cameras in which the direction of film transportation is normal to such a direction of movement of the input member, i.e., in cameras having top or bottom picture outlets.

SUMMARY OF THE INVENTION

It is an object of the invention to overcome this disadvantage.

More particularly, it is an object of the invention to provide an improved camera particularly of the instant-picture type, which utilizes an input member that is slidable in generally horizontal direction transverse to the optical axis and to the direction of film movement.

Another object is to provide such a camera wherein the input member can be readily manipulated by a user.

Still a further object is to provide a camera of the kind under discussion wherein the input member can operate the film transporting mechanism and/or other components of the camera (e.g., a shutter-cocking mechanism).

Pursuant to these objects and still others which will become apparent hereafter, one feature of the invention resides in a camera which, briefly stated, may comprise a camera body; a lens on the camera body and having an optical axis; a camera component in the camera body and operable by transmission of motion to the component; an input member slidable relative to the camera body in direction transverse to the optical axis between a first and a second position; and motion-transmitting means arranged to receive motion from the input member in response to sliding of the same between the positions, and to transmit the motion to the camera component.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

The Structure

Figure 1:
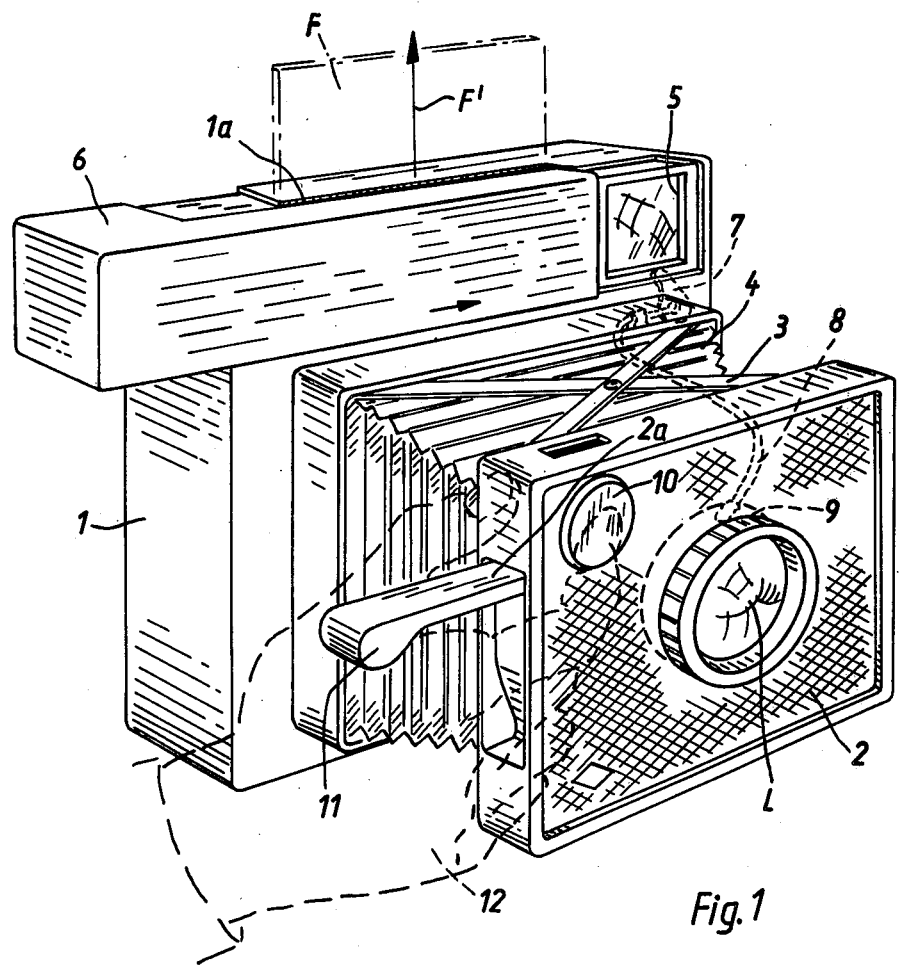
FIG. 1 is a perspective view of a camera embodying the invention.
Figure 2:
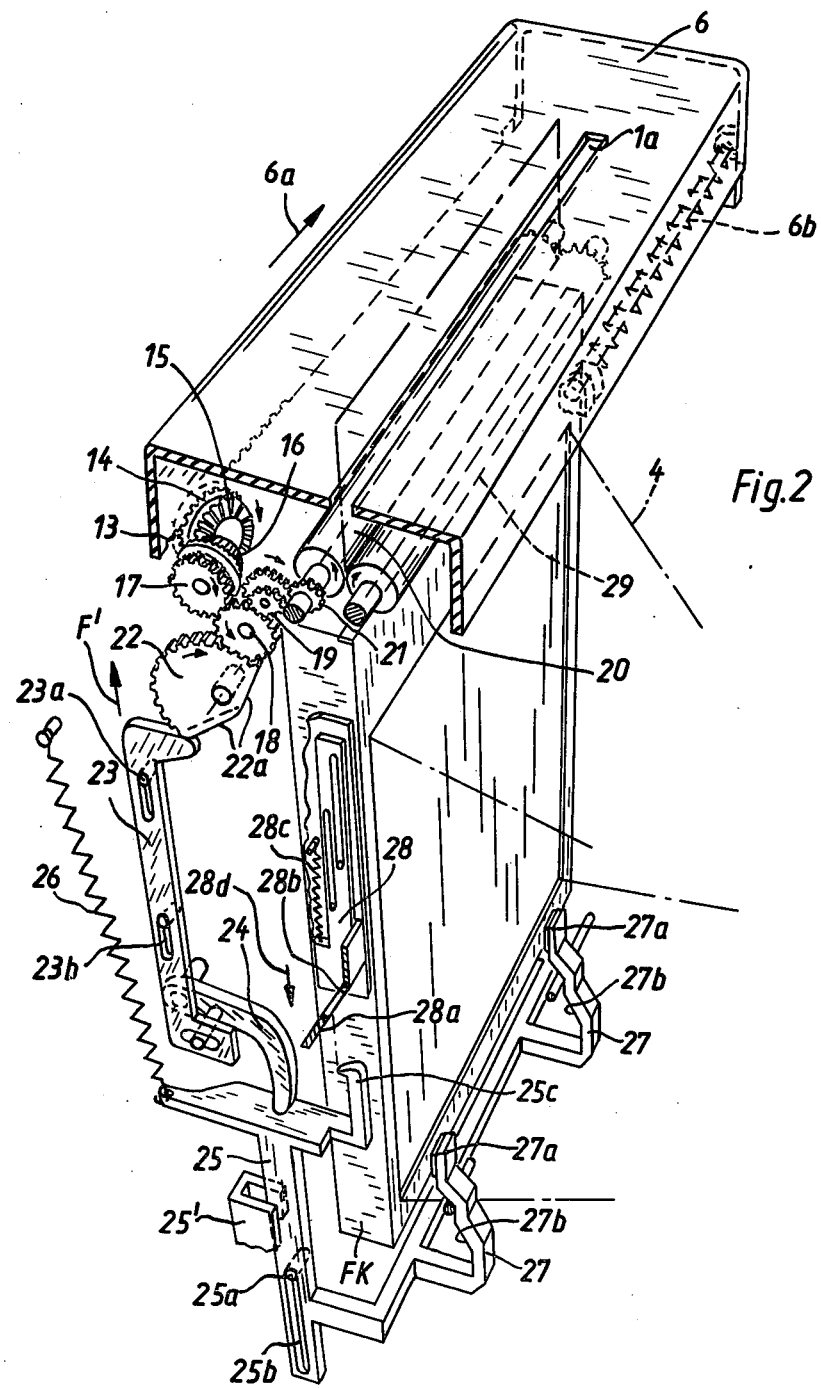
FIG. 2 is a perspective view of only the motion-imparting and transmitting elements of the camera in FIG. 1, other parts being omitted for clarity.

An exemplary embodiment of the invention is illustrated in FIGS. 1 and 2. The camera will be seen to have a camera body or housing which is composed of a main part 1 of essentially flat shape, a rigid lens carrier 2 with lens L which is connected to the main part 1 via pantograph linkages 3 at the top and at the bottom (not shown) of the lens carrier 2, and a flexible bellows 4 which is connected to part 1 and lens carrier 2 to prevent undesired entry of light into the camera.

The upper side of the main part 1 is provided with an outlet slot 1a through which film sheets F contained in a film pack cassette PK (FIG. 2) are ejected subsequent to their exposure through lens L. The main part 1 is also provided with a view finder 5 and carries an input member 6 which is slidable in (and opposite to) the direction indicated by the arrow 6a. When the input member 6 has been displaced rightward (with reference to the position shown in FIG. 2) to its rest position, it covers the viewfinder 5 to protect it against damage.

The lens mount 2 carries a shutter mechanism 9 of which no details are given because any shutter mechanism known per se can be used. To effect automatic cocking of the shutter mechanism 9 in response to movement of the input member in direction of the arrow 6a, to pivotable lever 7 is provided (FIG. 1) having an arm which extends into the path of movement of the input member 6. Another arm of lever 7 is connected with one end of a Bowden linkage, the other end of which is connected with the cocking member of the shutter mechanism 9. Thus, displacement of input member 6 in the direction of arrow 6a will ultimately (towards the end of such displacement) result in engagement of the member 6 with lever 7, causing the same to pivot and to cock the shutter mechanism 9 via the linkage 8.

A shutter release member 10 (e.g., push button, diaphragm or the like) is provided on lens mount 2 and suitably (in a manner known per se) connected with the shutter mechanism to trigger the shutter when member 10 is operated. To stabilize the camera in use against shaking, and also to make the holding and operating of the camera easier for a user, a sidewall 2a of the lens carrier which is located adjacent to the member 10, is provided with a support member 11. The sidewall 2a may have a recess in which the support member 11 is pivotably mounted so that it can be normally retracted in this recess and can be pivoted to the illustrated use position when desired. In that position the support member 11 can rest on the hand 12 of a user to stabilize the camera.

A drive which converts the translatory (sliding) movement of input member 6 into other movements of the film transporting mechanism, is shown in FIG. 2.

It will be seen that input member 6 is provided with a rack 13 extending along one of its longitudinal side edges. The teeth of rack 13 mesh with a gear 14 which is rigidly (non-rotatably) connected to (or of one piece with) a bevel gear 15. The latter meshes with a further bevel gear 16 which in turn is rigidly connected to (or of one piece with) a gear 17. The axes of rotation of gears 15, 16 extend normal to one another. Gear 17 meshes with gear 18 of a gear train 18, 19; the output gear 19 of the gear train meshes with the teeth of a pinion 21 which is mounted on a shaft or trunnion of a roller 20. Roller 20 defines with another roller 29 a nip through which each film sheet F must pass, whereby the film sheet is transported in the direction indicated by arrow F' (FIG. 1) while at the same time developer is squeezed from the developer pouch of the film sheet (not shown, but known per se) and spread over the exposure area.

In addition to meshing with the gear 19, the gear 18 also meshes with a gear segment 22 having a tooth-free edge face 22a. A member 23 is slidably mounted by means of pin and slot guides 23a, 23b and its upper end bears against the periphery of the gear segment 22 whereas an arm 24 which is secured to member 23 bears against another member 25 which is also slidably mounted by means of pin and slot guides 25a, 25b. The member 25 is permanently biased in the upward direction (i.e., the direction indicated by the arrow F') by the action of a spring 26 and, since it bears upon member 23 via arm 24, causes the upper end of member 23 to maintain tracking engagement with gear segment 22.

Member 25 is also guided in a guide rail 25'; since it has only a single pin 25a the member 25 can (and under the influence of spring 26 does) tilt slightly in counter-clockwise direction (the depth of the groove in guide rail 25' permits this). Member 25 is provided with arms 27 the free end portions 27a of which are film-sheet transporters. When the arrangement is at rest (FIG. 2) these free end portions 27a are located outside the window of the film pack cassette FK through which the respective film sheets F are exposed. Another slidable member 28 is mounted on the main part 1 and provided with an inclined edge face 28a and a recess 28b for entry of a hook 25c of the member 25.

A telescope-type spring 6b resiliently resists the movement of input member 6 in the direction 6a. It may be composed of a rod connected to the housing part 1 and a helical spring which surrounds the rod and bears against the housing part 1 and against the member 6. Of course, the arrangement could be reversed. A latching arrangement (not shown) will normally be provided to keep the member 6 in the rest position in which it covers the view finder 5, until the camera is to be used.

The Operation

With the member 6 in the position of FIG. 2 a user who desires to take a picture operates the shutter release member 10. This causes the film sheet F which in the film pack cassette FK is closest to the window (hence to the lens 6) to become exposed with scene light. Thereafter, the user pushes the input member 6 in the direction of arrow 6a with one hand, while the other hand grips the main housing part 1. This causes rack 13 to rotate the bevel gears 15, 16 and via the same the gear 18 and the gear segment 22. The edge face 22a now becomes located opposite the upper end of member 23, with the result that the member 23 is released to move upwardly under the urging of spring 26. Member 25 can, of course, now also move upwardly and (due to the slight anticlockwise bias imparted to it by spring 26) the end portions 27a enter through the window in film pack cassette FK, contact the exposed film sheet F and, during continued upward movement of the member 25, push the film sheet F upwardly until its upper end enters the nip between the rollers 20, 29. Since the roller 20 is being rotated at the same time via gears 18, 19 and pinion 21, the rollers 20, 29 grip the film sheet F entering the nip and transport it further in upward direction. As soon as the member 25 has moved up far enough for the hook 25c to engage the inclined cam face 28a, this cam face imparts a slight clockwise tilt to the member 25, sufficient to make the end portions 27a move out of contact with the film sheet F so as not to hinder further transportation of the same by the rollers 20, 29. At this time the hook 25c snaps into the recess 28b of member 28.

The preceding movements are completed by the time the input member 6 has travelled a small part of its path in the direction of arrow 6a. During the remainder of the displacement of the member 6 — during which the member 28 moves along with the member 25 to which it is latched via 25c, 28b — only the rollers 20, 29 continue to be rotated (by gears 18, 19) until the film sheet F is expelled through slot 1a (FIG. 1). Shortly before the member 6a has completed its movement 6a, it pivots the lever 7 and thereby cocks the shutter mechanism 9 via the linkage 8. The camera is now ready for the next exposure.

Member 6 can be retained in this position (for storage or travel) by a not-illustrated latching arrangement. When this arrangement is released, or if it is not engaged subsequent to the displacement of member 6 as described above, then the spring 6b will move the member 6 back towards its starting position (FIG. 2). Shortly before it reaches this starting position the user must supply some additional force acting counter to arrow 6a, because the member 25 must be moved to its own starting position (FIG. 2) counter to the force of spring 26; the force of spring 6b is not sufficient for this because an adequately strong spring 6b would oppose too strong a force to the user's moving the member 6 in the direction 6a.

To avoid sliding of the end portions 27a on the surface of the next unexposed film sheet during the resetting of the arms 27 the hook 25c remains in the recess 28b and pulls the member 28 in the direction of arrow 28d until the inclined surfaces 27b of the arms 27 lift the hook 25c out of the recess 28b. Member 28 returns pulled by the spring 28c to the position shown in FIG. 2.

It should be understood that various modifications may be made in the described embodiment, and that the invention is by no means limited to this (merely exemplary) embodiment. For example, the structure for transmitting motion from gears 15, 16 to the member 25 could be different from that which has been described. The arrangement for cocking the shutter mechanism 9 in response to movement of the input member 6 can be used even in a construction in which the input member 6 does not also operate the film transporting mechanism, and the support member 11 can, of course, be used in other types of cameras and/or in cameras having other kinds of film transporting mechanisms.

While the invention has been illustrated and described as embodied in an instant-picture camera, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A camera, particularly an instant-picture camera, comprising a camera body; a lens on said camera body and having an optical axis; a film transporting mechanism in said camera body; an input member slidable transversely of said optical axis between a first and a second position; and motion-transmitting means arranged to receive motion from said input member in response to sliding of the same between said positions, and to transmit the motion to said film transporting mechanism to thereby drive the same, said motion transmitting means comprising a rack movable with said input member, a first bevel gear meshing with said rack and driven by the same and a second bevel gear meshing with said first bevel gear to receive rotary motion from the same, said bevel gears having respective axes of rotation which extend normal to one another.

2. A camera as defined in claim 1, said camera body having a viewfinder, and wherein said input member covers said viewfinder in one of said positions.

3. A camera as defined in claim 1, wherein said film transporting mechanism comprises a pair of cooperating rollers together defining a nip through which film being transported must pass.

4. A camera as defined in claim 1, further comprising a shutter; and means to cock said shutter in response to movement of said input member between said positions thereof.

5. A camera as defined in claim 4, said cocking means comprising a lever having a portion which extends into the path of movement of said input member so that the lever is displaced in response to sliding of the input member between said positions, and a Bowden linkage connecting said lever with said shutter to cock the latter when said lever is displaced.

6. A camera as defined in claim 1, said camera body having a main section of substantially flat configuration, and a lens-mount section which is movable relative to said main section between an inoperative retracted and an operative extended position; a shutter on said lens mount; and a shutter release member also on said lens mount.

7. A camera as defined in claim 6, said lens mount having a side wall laterally spaced from said optical axis; and a support member on said side wall and being movable relative to the same between a withdrawn position and an extended position in which latter it may support the camera body against a hand of a user.

* * * * *